Figure 1:
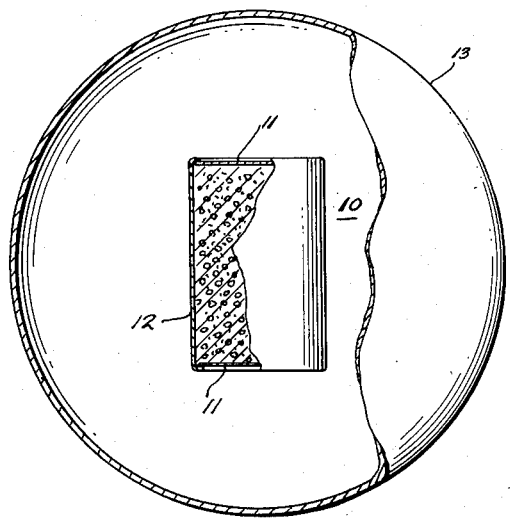

Oct. 23, 1962

K. E. SAGER 3,059,253

EMERGENCY FLOAT

Filed April 2, 1959

2 Sheets-Sheet 1

Inventor
KARL E. SAGER

Oct. 23, 1962  K. E. SAGER  3,059,253
EMERGENCY FLOAT

Filed April 2, 1959  2 Sheets-Sheet 2

Inventor
KARL E. SAGER
By Soans, Anderson, Luedeka & Fitch
Att'ys

United States Patent Office 3,059,253
Patented Oct. 23, 1962

3,059,253
EMERGENCY FLOAT
Karl E. Sager, 620 E. North St., Appleton, Wis.
Filed Apr. 2, 1959, Ser. No. 803,742
3 Claims. (Cl. 9—8)

The present invention generally relates to improved means for emergency use and more particularly to an improved water float for emergency use, an improved method of making the same and to cartridges for use in connection with float chambers during emergencies.

The present invention minimizes the possibility of sinking due to puncture, leakage or other failure and is equally adaptable for use in float devices for individuals and for boats, ships, life rafts, aircraft and the like.

Presently available emergency float devices take a wide variety of forms, ranging from inflatable life vests and rafts for use by sailors and aviators to larger devices such as watertight compartments in ships and aircraft. Most float devices present the hazard of failure due to puncture or leakage if damaged in any way. Only such float chambers as can be made watertight are at all suitable for emergency use. Accordingly, many compartments of a ship or aircraft which are considered as potential floats may, in reality, be useless for such purposes during an emergency.

Various types of foams of synthetic resins and other materials are used in float devices, due to their excellent resistance to water and their low density. The foams while in the form of blocks and slabs are fabricated into float devices. These float devices have the disadvantage of being relatively bulky in order to provide a significant degree of floatability to a given region.

It is a primary objective of this invention to provide emergency float means. It is a further object to provide compact means capable of rapidly expanding a suitable substance into a non-sinkable foam at the time of emergency need, said means occupying a minimum amount of space until activated.

Another object of the present invention is to provide means for and a method using as emergency float chambers compartments which in normal use serve other purposes and which would not ordinarily be watertight.

A further object of the invention is to provide a compact cartridge or other source of buoyant foam for use in conjunction with existing emergency float devices, including inflatable types and also rigid types such as the usual watertight compartments of a ship or airplane.

Other objects and advantages of the present invention will be apparent upon a study of the following detailed description and the accompanying drawings of which:

FIGURES 1 to 7, inclusive, are schematic side elevational views of various embodiments of emergency float apparatus in accordance with the present invention, in each of said FIGURES 1 to 7, inclusive, portions of the apparatus being broken away to show the internal construction thereof.

FIGURES 1 through 5 schematically illustrate emergency float cartridges using heat-expandable beads as the potentially buoyant material. FIGURE 6 illustrates a pressure cartridge adapted to mix two potentially reactive materials to produce a buoyant foam at the time of need.

Figure 7:
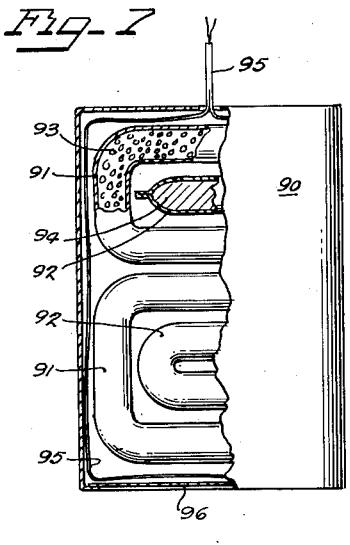

FIGURE 7 illustrates schematically another type of cartridge which separates the reactive materials from each other until the time of use.

In each instance, a potentially expandable material or combination of materials is provided in cartridge form and occupies minimum cubic space. Such cartridges may be readily installed in any desired location, may be removed for checking, servicing or replacement, and may be connected as appropriate to a compartment where buoyancy is desired in an emergency. For example, an airplane wing chamber, fuel tank, or fuselage compartment normally used for other purposes and not necessarily watertight may be quickly converted into a float chamber by activating such a cartridge. When flooded with a water-resistant buoyant foam, such compartments at once become virtually unsinkable float chambers. Even if water enters the compartment before the foam is generated, the expansive force of the foam can be such as to displace the water and to restore buoyancy to the compartment.

In another instance, where an inflatable life vest or raft of the usual type is used, the buoyant chambers of such devices may be filled with an expanding light-weight foam as they are being inflated. Thereafter, any damage or puncture will not cause the inflatable device to sink because the presence of the buoyant mass of foam will prevent collapse. This enables such devices to be constructed of less expensive lighter weight materials and more rapidly with less compartmentation than has been feasible heretofore.

The particular means selected to actuate the cartridge and its contents will necessarily depend upon the nature of the foaming material and the anticipated circumstances of emergency use. For example, many inflatable devices have controls which automatically operate upon contact with water, thus avoiding the need for human attention. Other devices are activated or inflated by the user at the time of need. See, for example, United States patents, No. 2,046,355 to Manson and No. 2,550,562 to Hurt et al. In each instance, such activation can be readily adapted to perform the additional function of causing the contents of the cartridge to expand into a low density buoyant mass. The various figures illustrate how this may be readily accomplished and the controls themselves are well known and need not be described further.

The foaming, expandable materials themselves are also well known and this technology is rapidly developing. Some of the more likely materials presently available are described below, but those skilled in the resin art will be able to employ an even greater variety of such materials as well as future new materials in the practice of this invention. Heat-expandable plastic beads may also be used as the source of buoyant material and are described in greater detail in connection with FIGURES 1 through 5. Among the foaming resins which may be used with the FIGURES 6 and 7 arrangements are urethanes, epoxys, mixtures of epoxy resin and plastic beads, B-stage phenolic resin with acid catalyst, and thermoplastic resins such as polyvinyl chloride and polyethylene with suitable blowing agents.

The thermosetting resin foams generally are formed by self-expansion of a resin mixture. Curing occurs simultaneously during foaming to produce a hardened expanded structure. For example, a foaming urethane mixture may be produced as follows:

A homogeneous premix is prepared by thoroughly mixing 100 parts by weight of a polyester resin, 4 parts of water, 1 part of catalyst such as N-methyl morpholine, and 1 part of a surface active agent. Generally a non-ionic type of surface active agent is used. The polyester resin has an acid number of 15–20, hydroxyl number of 465–495, and a relatively low viscosity of 60,000–80,000 cps. (as measured by the Brookfield viscosimeter at 25° C.) and a water content of 0.1–0.4%.

Mixing is continued for about 30 minutes, care being taken to avoid introducing air. When such a premix is blended with 170 parts of a tolylene diisocyanate, a foaming reaction begins within 30 to 60 seconds with evolution of some heat which further accelerates the reaction. The tolylene diisocyanate has an isocyanate equivalent of 118–123 and a viscosity of 150–200 cps. at 25° C.

Carbon dioxide is evolved and promotes development of a cellular foam structure.

The foaming and curing rates are controlled by the amount of catalyst, tertiary amines generally being used in amounts of from ½ to 2 parts per 100 parts of polyester resin. Typical catalysts, in addition to N-methyl morpholine, are N-alkyl morpholines such as N-ethyl and N-coco morpholine. For higher reaction rates one may use hydroxyalkyl amines such as dimethylethanol amine, tetrahydroxy ethylethylenediamine, trialkylamines such as triethylamine and N,N-dimethylcyclohexylamine. The catalyst sodium methyl siliconate is highly effective with polyester resins having a low acid number since it produces extremely rapid foaming and gelling. This catalyst is employed where a very rapid setting formulation is desired.

As presently understood, the presence of water in the foaming urethane mixture promotes the cross-linking of the components. The catalyst promotes the formation of $CO_2$ which forms cells and develops the foamed structure. Catalysts may be omitted if another compatible source of expanding gas is supplied. For example, the many varieties of Freon (fluorocarbon) propellants may be used to foam urethane mixtures as the reaction progresses. This technique offers the advantage of controlling the exothermic reaction because of the cooling effect of the expanding gas bubbles. Thus a very bulky low density foam is produced before the reaction has progressed to the point where the cellular structure begins to set.

Flame retardants may be added to the premix if desired. Simon et al., United States Patent No. 2,577,281 illustrates one such material.

Density of the foamed product will vary from about 1.8 pounds per cubic foot to 2.5 pounds per cubic foot, depending upon amount of catalyst, water, and diisocyanate, degree of confinement during expansion, temperature, and the like. Even if optimum conditions for expansion are not present at the time of emergency use, a mass having sufficiently low density to serve as a float will be produced. Depending upon the above conditions and choices of reactants, maximum foaming may be reached in from 2 to 3 minutes or less, whereafter the foam begins to set. Maximum physical properties develop more slowly, depending upon temperature, but such properties are relatively immaterial for the intended purpose of an emergency water float, since the desired features of water repellancy and buoyancy are obtained almost immediately.

Further information as to such urethane foams may be had by reference to the literature and from various commercial suppliers. United States patents describing the same include Simon et al., Patent No. 2,577,279, Patent No. 2,577,280, Patent No. 2,591,884, Patent No. 2,764,566, Hoppe et al., Patent No. 2,764,565, Winkler, Patent No. 2,770,241, and Reis, Patent No. 2,779,689.

Thermoplastic foams such as expanded polyvinyl chloride may be produced by the methods of Sprague et al., United States Patent No. 2,737,503 and Schwencke, United States Patent No. 2,666,036.

Similar information is available concerning the epoxy foams, which produce densities of from 2–20 pounds per cubic foot. These materials may also be compounded to be self-extinguishing in the event of fire. The Dow Chemical Company Bulletin 171–81 describes a mixture designated as Q–4124.2 which is a styrene-epoxy self-expanding material. The heat of reaction from the epoxy resin during curing after combining with curing agent and modifier causes expansion of polystyrene beads included in the mixture to produce a foamed mass having a density of from 4½ to 20 pounds per cubic foot. From one to two parts by weight of expandable beads are used for each part of epoxy resin.

Methods of producing expanded phenol-aldehyde resins by reaction with acids and hydrogen peroxide are illustrated in United States Patent No. 2,653,139 to Sterling.

Now referring to the accompanying drawings, FIGURES 1 to 5, inclusive, illustrate how heat-expandable plastic beads may be used in the emergency water float apparatus of the present invention. In accordance with the method of the present invention, an improved emergency float is provided by disposing a readily expandable, relatively dense organic substance, such as one or more of the indicated resins in bead form, in a potential float chamber, and expanding the organic substance in situ in the float chamber in response to an emergency, whereby the floatability of the chamber is substantially increased.

Plastic beads of the indicated type are well known and generally comprise a thermoplastic resin such as polystyrene and a blowing agent which creates a gas when heated. Some of the well-known blowing agents which produce nitrogen when heated are diazo amino benzene, azo isobutyric dinitrile, dinitroso pentamethylene tetramine, diethyl azo isobutyrate, and 1,3-bis (xenyl)-triazine.

In the initial condition before expansion, the beads may be from 0.8 to 1.5 mm. in diameter and a quantity of the same will usually weigh from 35 to 40 pounds per cubic foot. When subjected briefly to moderate heat, as by steam, hot water, hot oil, or by radiation, the beads will expand to a mass usually weighing from 1.0 to 10 pounds per cubic foot. If confined to a mold during heating, the beads will fuse together to form a unicellular rigid foam-like mass having the shape of the mold. Subsequent curing is unnecessary and, upon cooling, the thermoplastic resin foam retains its shape and other physical properties. Among these is a high degree of buoyancy and resistance to water penetration. If not confined to a mold when subjected to heat, the individual beads will expand even more freely, forming generally spherical bubbles or groups of bubbles of low density which resist water penetration. A mass of such expanded material confined in a float chamber will provide a light, safe, highly satisfactory float device.

Various means of providing heat may be employed, in accordance with the present invention, depending upon circumstances. If the beads are in a thin layer, from 1500 to 2500 watts of radiant heat per square foot applied for from 5 to 10 seconds will foam the beads to densities of about 2 pounds per cubic foot. Heating for two minutes in air heated to 250 to 275° F. or in steam at atmospheric pressure (212° F.), will produce similar densities. A boiling water or hot oil bath may also be employed. Further technical information regarding these materials may be obtained from the suppliers.

It is desirable to confine the unexpanded beads in the emergency float device in such fashion that heat may be applied uniformly and quickly throughout the entire mass of beads at the time of use. If not so confined, the application of heat will be diffused and will not be as effective to obtain optimum expansion of the beads. Such float devices may include a compact cartridge which is readily installed in crowded locations and serviced without difficulty.

FIGURE 1 of the accompanying drawings illustrates a simple form of the invention in which a container 10 having end closures 11 confines a compatible mixture 12 comprising heat expandable beads and a potentially exothermic material. When this mixture is penetrated by water, heat is evolved and the beads expand. The end closures 11 are so constructed as to release the expanding mixture as soon as moderate pressure forces develop. The expanding low density beads will thus escape into the confining float chamber, generally indicated as 13, within or adjacent to which the container has been installed. This chamber may be a wing or fuselage section or an emptied tank of a boat or airplane. It may also be a flexible life vest or life raft. Means, not shown, may be provided to puncture the end closure to admit water during an emergency. Or the closure may be water permeable or soluble to automatically activate the device when contacted by water during an emergency. One of the closures may be so designed as to admit water while the other closure is designed to be displaced by pressure, whereby the expanding contents of the container are expelled into the float chamber.

Figure 2:
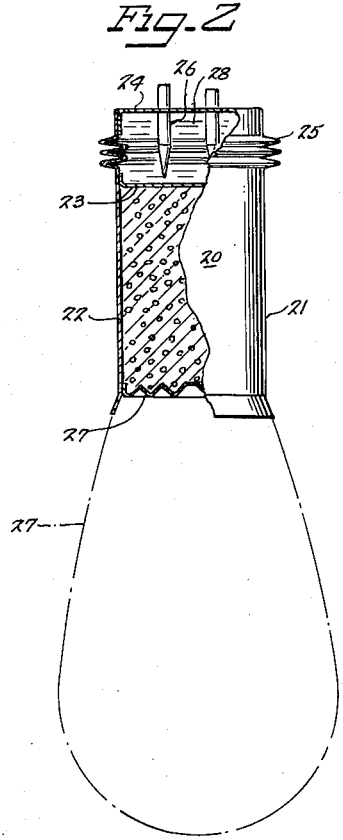

FIGURE 2 illustrates an arrangement which is not dependent upon an external source of water or other material to initiate the exothermic reaction. As shown schematically, a two-compartment container 20 has a compartment 21 which holds a compatible mixture 22 of heat expandable beads and a potentially exothermic material. Diaphragm 23 isolates this mixture from another compartment 24 containing water or other material 28 which will initiate an exothermic reaction when allowed to enter compartment 21. This is accomplished by providing a resilient or elastic wall section 25 in compartment 24 and puncturing needles 26. The application of force on top of compartment 24, as in an emergency, will cause needles 26 to puncture diaphragm 23, allowing the exothermic reaction to begin. The opposite end of container 20 is provided with expandable closure 27. As the contents of the container expand due to the generation of heat, closure 27 stretches, as shown by the dotted lines, to form an emergency float chamber. Thus, a self-contained emergency float is produced.

Figure 3:
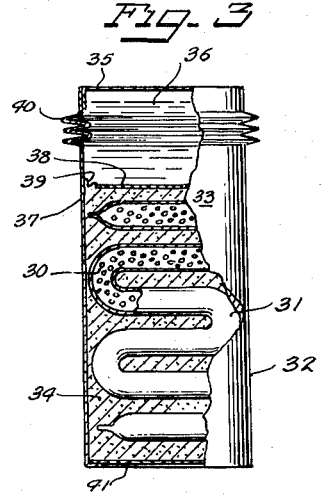

A somewhat similar self-contained emergency float is illustrated by FIGURE 3. In this instance, however, the exothermic material need not be compatible with the expandable plastic beads. The beads 30 are encased in an envelope 31 of plastic material such as polyethylene film. This serves not only to protect the beads from any adverse effects of the exothermic material but maintains the beads in layers having an extended surface area for optimum heat transfer. The envelope 31 containing the plastic beads is folded within compartment 32 of container 33. Potentially exothermic material 34 such as calcium oxide is packed around and between the folds of the flexible envelope in compartment 32. Calcium oxide will produce about 600 B.t.u. per pound.

A second compartment 35 contains water or other material 36 which will cause an exothermic reaction when in contact with material 34. The two compartments are separated by diaphragm 37 which has a stiff central portion 38 and a rupturable seal 39 around its periphery. The wall of compartment 35 is made slightly resilient by means of wall section 40 which may be shaped like a bellows. Thus, when force is applied to the top of compartment 35, the liquid pressure exerted against diaphragm 37 will rupture seal 39, allowing the liquid to mix with exothermic material, generating heat and causing the heat-expandable beads to swell. If desired, the top compartment may be pushed in and out to promote thorough mixing of the contents of the container. A pressure rupturable or displaceable end closure 41 holds the contents of compartment 32 in place until expansion begins. Thereafter, it allows the plastic envelope and its contents of expanded beads to escape by expansion into the float chamber in which the emergency float device has been installed. The plastic envelope 31 may be sufficiently elastic to contain the expanded low density beads, thereby forming an independent float chamber or supplementing the float chamber in which the device has been installed. On the other hand, the plastic envelope may be so designed as to rupture and release the expanded mass of plastic beads within the float chamber.

Figure 4:
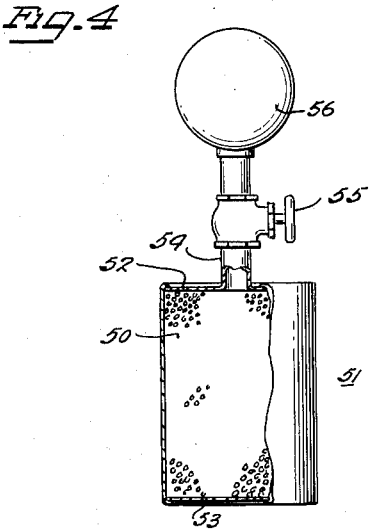
Figure 5:
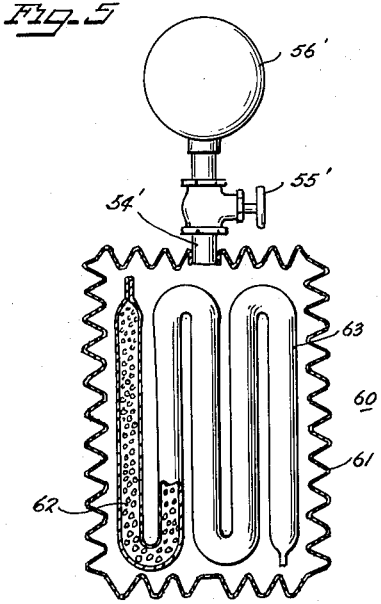
Figure 6:
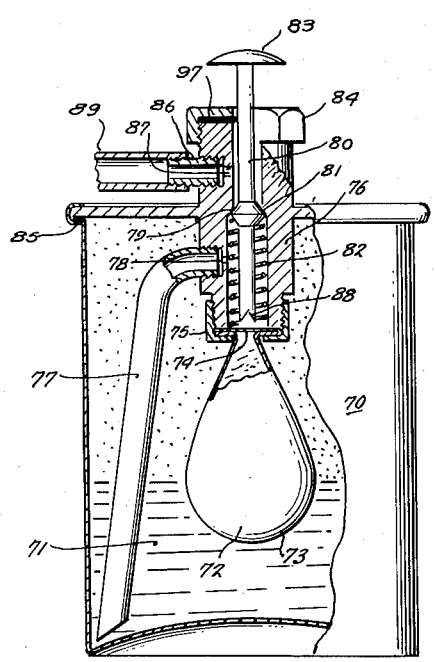

FIGURES 4 and 5 illustrate means which depend upon a source of external heat to expand the plastic beads. In FIGURE 4, a supply of heat-expandable beads 50 in container 51 is protected until the time of emergency use by end closures 52 and 53. Closure 53 is adapted to be displaced by moderate force exerted as the beads expand. The opposite closure 52 is connected to a source of heat by means of pipe 54 and valve 55. A heat source 56, shown schematically, may be any convenient element of an aircraft or ship motor, such as hot oil from the lubrication system, hot water from a heat exchanger, or steam from a boiler. In normal operation these sources of heat would be isolated from container 51 and its contents by valve 55. At the time of emergency, the valve is opened and the heating medium is forced into the container to mix with the expandable beads. As the beads expand, closure 53 is displaced and the low density expanded beads escape into the float chamber within which the emergency device is installed.

FIGURE 5 illustrates another form of cartridge 60 connected to the same heat source 56, illustrated in FIGURE 4, by means of pipe 54' and valve 55'. In this instance, the expandable beads 62 are within an elastic cartridge wall 61 which may itself form the emergency float chamber when expanded. If desired, the plastic beads may be additionally enclosed in an envelope of plastic material 63. This ensures even distribution of heat throughout the mass of beads and presents an extended surface area to the heating medium. As valve 55 is opened, heating material will flow into the cartridge 60, expanding the beads, the elastic wall 61, and the plastic envelope 63.

In FIGURE 6 a foaming type of resin and a suitable catalyst mixture are used as the potentially buoyant mass. An external source of heat is unnecessary, although some heat may be generated during the foaming reaction. Pressure can 70 contains a propellant and reactant mixture 71. Suitable propellants include nitrogen, nitrous oxide, dimethyl oxide, di-fluoro-dichloromethane and carbon dioxide. Many other propellants, which preferably should be non-flammable, are known and may be used if compatible with the reactant mixture.

The other components 72 needed to produce a foaming resin reaction are sealed in a flexible inner container 73 by means of a rupturable diaphragm 74. The flexible container 73 and seal 74 are held in position by a threaded cap 75 and by valve body 76. The propellant-reactant mixture communicates by way of tube 77 and expansion orifice 78 with the hollow interior of valve body 76 but is prevented from escaping until the time of use by conical valve 79 mounted on valve stem 80 and held in sealing position against valve seat 81 by means of spring 82. The upper end of valve stem 80 is guided and sealed by flexible gasket 97 and is threaded into an enlarged end 83. The inner bore of the valve body is of greater diameter than valve stem 80 so as to permit liquid and gas to flow from the interior of the pressure can when the valve is opened. Gasket 97 prevents leakage around the outer edge of the valve stem and is held in position by cap 84 which is threaded to fit the upper end of valve body 76. The valve body may extend across one end of the pressure can, being sealed around its periphery by gasket 85 crimped to the end of the can. That portion of the valve body which projects outwardly from the pressure can is provided with a threaded nipple 86 which leads to any desired float chamber (not shown). A second expansion orifice 87 connects the nipple with the inner bore of valve body 76.

When the emergency float device is to be used, pressure is applied to the enlarged end 83 of valve stem 80 to open conical valve 79 and simultaneously puncture diaphragm 74 by means of prongs 88. The reactant mixture and propellant gas 71 then flow through tube 77 and expand through orifice 78 into the inner bore of valve body 76, creating a region of reduced pressure. This causes the flexible container 73 to expel its contents through the broken seal 74 and into the stream of material escaping around valve 79 and its stem 80. The various restrictions along the path of flow, and the second orifice 87 ensure thorough mixing of the various materials. The expanding propellant material aids in the formation of the foamed mass and the chemical reaction which begins as the component materials are mixed will continue to completion after the materials enter the float chamber through nipple 86 and pipe 89. Normally the entire contents of the device will be used at once. If desired, means (not shown) may be provided to hold the valve in an open position. Simple valve devices of this general type are shown in United States Patent No. 1,892,750 to Rotheim. To further promote the rapid formation of a stable foam, the interior surfaces of the float chamber walls may be pre-treated with catalyst. This is especially applicable where the float chamber is an inflatable device.

FIGURE 7 illustrates another means of bringing two reaction components into close proximity. Container 90 retains two plastic envelopes 91 and 92 within which are sealed reaction components 93 and 94, respectively. These envelopes are interfolded within the container and encircled by a rip cord 95 which extends from one end of the container. The opposite end 96 of the container is of such construction as to be displaced by moderate outward pressure. As the rip cord is pulled, it slices through the plastic envelopes and releases their contents for rapid and complete intermixing. A foaming reaction begins at once and displaces the end 96 of container 90. The foaming contents thus enter a float chamber (not shown) within which the device is installed and the foaming reaction progresses to form a buoyant stable resin foam. It will be readily seen that glass containers and any suitable fracturing device may be substituted for the plastic envelopes and rip cord illustrated in FIGURE 7. If desired, an expandable end closure such as is shown in FIGURE 2 may be used to produce a self-contained emergency float.

In each of the instances described above, the expanded resinous material forms a non-collapsing buoyant mass which remains effective even if water should enter or be present in the float chamber. Expanded polystyrene beads, for example, exhibit zero capillarity and absorb less than 1% water by volume when subjected to a 10-foot water head for 48 hours. The urethane foams comprise from 85 to 90 percent closed cells and absorb only about 0.05 pound of water per cubic foot after immersion for 24 hours at 75° F.

As previously pointed out, this invention makes it possible to use almost any portion of a ship or airplane as an emergency float chamber and such chambers need not be watertight. Spaces normally used for other purposes may be flooded with the foam material, which will flow around other objects which may be in the space.

Additional advantages of the present invention include the low cost of the cartridge containing the expandable material, and the compactness of the cartridge. In this connection, such cartridge occupies a relatively minor volume in contrast to the total volume of the foam when fully expanded from the cartridge during an emergency.

Other advantages of the present invention are set forth in the foregoing.

Such modifications in the method, cartridge and emergency float device of the present invention as are within the skill of those versed in the art are contemplated as being within the scope of the present invention.

I claim:
1. An improved emergency water float cartridge comprising a container and a mixture of a readily expandable, relatively dense resinous substance capable of expanding to a low density, stable, water-resistant foam and an activator capable of expanding said resinous substance upon contact with water during an emergency, means adapted to effect said contact during an emergency and means adapted to permit passage of said resinous substance from said container only in expanded form.

2. An improved emergency water float cartridge comprising a container and a mixture of a readily expandable, relatively dense resinous substance capable of expanding to a low density, stable, water-resistant foam and an activator capable of expanding said resinous substance upon contact with heat during an emergency, means adapted to effect said contact during an emergency and means adapted to permit passage of said resinous substance from said container only in expanded form.

3. An improved emergency float cartridge comprising a container and a mixture of a readily expandable, relatively dense resinous substance capable of expanding to a low density, stable, water-resistant foam and an activator capable of expanding said resinous substance upon contact with an emergency-derived stimulus during an emergency, means adapted to effect said contact during an emergency and means adapted to permit passage of said resinous substance from said container only in expanded form.

References Cited in the file of this patent
UNITED STATES PATENTS

| 2,140,552 | Roberts | Dec. 20, 1938 |
| 2,395,266 | Gardner | Feb. 19, 1946 |
| 2,409,910 | Stober | Oct. 22, 1946 |
| 2,582,228 | Brinkema | Jan. 15, 1952 |
| 2,653,139 | Sterling | Sept. 23, 1953 |
| 2,660,194 | Hoffman | Nov. 24, 1954 |
| 2,898,634 | Alderfer | Aug. 11, 1959 |
| 2,958,905 | Newberg et al. | Nov. 8, 1960 |
| 2,989,938 | Patterson | June 27, 1961 |

OTHER REFERENCES

Plastics Publication of April 1950, pages 93, 94, and 95 relied on.